(12) United States Patent
Vuppuluri et al.

(10) Patent No.: US 9,467,348 B2
(45) Date of Patent: Oct. 11, 2016

(54) SYSTEMS, METHODS, AND DEVICES FOR REDUCING OVERHEAD MESSAGING IN NETWORKS

(71) Applicant: VIASAT, INC., Carlsbad, CA (US)

(72) Inventors: Nirmal Vuppuluri, Potomac, MD (US); Punit Mukhija, Clarksburg, MD (US)

(73) Assignee: VIASAT, INC., Carlsbad, CA (US)

( * ) Notice: Subject to any disclaimer, the term of this patent is extended or adjusted under 35 U.S.C. 154(b) by 71 days.

(21) Appl. No.: 14/610,509

(22) Filed: Jan. 30, 2015

(65) Prior Publication Data

US 2015/0223112 A1 Aug. 6, 2015

Related U.S. Application Data

(60) Provisional application No. 61/934,576, filed on Jan. 31, 2014.

(51) Int. Cl.
*H04W 28/06* (2009.01)
*H04L 12/24* (2006.01)
*H04L 12/751* (2013.01)

(52) U.S. Cl.
CPC ............ *H04L 41/22* (2013.01); *H04L 45/02* (2013.01)

(58) Field of Classification Search
CPC ............................ H04L 45/02; H04L 41/12
See application file for complete search history.

(56) References Cited

U.S. PATENT DOCUMENTS

| | | | | |
|---|---|---|---|---|
| 6,751,660 B1 * | 6/2004 | Mansingh | ............... | H04L 49/15 370/236 |
| 7,983,239 B1 * | 7/2011 | Weinstein | ............... | H04L 45/02 370/238 |
| 8,830,875 B1 * | 9/2014 | Bulusu | .................... | H04L 45/48 370/256 |
| 2007/0127395 A1 * | 6/2007 | Jain | ......................... | H04L 45/02 370/254 |
| 2007/0127396 A1 * | 6/2007 | Jain | ......................... | H04L 45/02 370/254 |
| 2009/0324222 A1 * | 12/2009 | Kunjidhapatham | .... | H04L 45/02 398/58 |
| 2011/0080851 A1 * | 4/2011 | Wan | ........................ | H04L 45/02 370/255 |
| 2013/0103739 A1 * | 4/2013 | Salgueiro | ................ | H04L 41/12 709/203 |
| 2014/0173137 A1 * | 6/2014 | Jacobson | .............. | H04L 45/021 709/248 |
| 2014/0365196 A1 * | 12/2014 | Melander | ............ | G06F 17/5009 703/13 |

OTHER PUBLICATIONS

Topology Dynamics and Routing for Predictable Mobile Networks: Fischer et al.*

* cited by examiner

*Primary Examiner* — Jay P Patel

(57) ABSTRACT

Systems, methods, and devices for reducing overhead messaging such as event-driven LSAs in networks are disclosed. Embodiments of such systems, methods, and devices generate a simplified link-topology map from a comprehensive link-topology map. The comprehensive link-topology map is representative of the links among a plurality of networked satellite-traffic terminals (STTs). Embodiments of such systems, methods, and devices also generate, based at least in part on the simplified link-topology map, an STT-specific set of link state advertisement (LSA)-transmission instructions for each STT in the plurality. At least one such set of LSA-transmission instructions directs the corresponding STT to transmit LSAs on less than all of the links that extend in the comprehensive link-topology map from the corresponding STT. In addition, embodiments of such systems, methods, and devices also transmit the respective sets of LSA-transmission instructions to the respective STTs for which said sets were generated.

22 Claims, 13 Drawing Sheets

FIG. 8

SYSTEMS, METHODS, AND DEVICES FOR REDUCING OVERHEAD MESSAGING IN NETWORKS

CROSS-REFERENCE TO RELATED APPLICATIONS

This application claims the benefit of U.S. Provisional Application No. 61/934,576 filed 31 Jan. 2014, entitled Systems, Methods, and Devices for Reducing Overhead Messaging in Networks, which is incorporated by reference herein.

BACKGROUND

In many TCP/IP networks, one or more routers use the Open Shortest Path First (OSPF) routing protocol to generate routing tables for each router. Such routing tables enable each router to deliver data to other routers and nodes (e.g., end terminal computing devices) throughout the network. Each router in the network may have one or more links that connect to other routers or nodes. Further, each router generates periodic messages known as link state advertisements (LSAs) that are provided to other routers in the network. Typically, each such periodic LSA provides information regarding the state of each of the links of the router that generated that particular periodic LSA. Further, when a link of a router faults (e.g., due to malfunction, disconnection, etc.), the router typically generates an event-driven LSA to be sent to the other routers in the network. Based on the receipt of the periodic LSAs and the event-driven LSAs, each router may implement a shortest path algorithm (e.g., Dijkstra's algorithm) to determine a shortest route from that router to every other router or node in the network.

In a typical implementation, periodic LSAs are provided by a router to every other router in the network every 30 minutes. If a first router does not receive a periodic LSA for a period of 60 minutes from a second router in the network, the first router typically updates its routing table to indicate the second router is down (e.g., malfunctioning, disconnected, etc.). The transmission of periodic LSAs congests the network with overhead messaging, which by definition is messaging that is used for overhead (i.e., administrative) tasks such as control and management of the network as opposed to substantive traffic communication between nodes. Thus, congestion due to overhead messaging reduces the effective bandwidth (i.e., throughput) of the network. The Internet Engineering Task Force (IETF) published Request for Comments No. 1793 (RFC 1793) on the topic of reducing the transmission of periodic LSAs in a network. One aspect of RFC 1793 involves designating an LSA as Do-Not-Age (DNA). LSAs that are designated as DNA do not age and therefore do not need to be periodically refreshed, thus reducing overhead messaging in the network and improving the effective bandwidth (i.e., throughput) of the network.

Event-driven LSAs can also cause (or at least contribute to) congestion in a network as a result of links, nodes, and/or routers in the network faulting due to malfunctions, due to management operations by a network operator (e.g., via a network control center/network management system (NCC/NMS)), and/or due to one or more other causes. Such management operations may include reconfiguring (e.g., setting up and tearing down) links on a node or router or conducting maintenance (that often involves powering down routers, nodes or links), as just a few examples. Such events may occur relatively often, thereby triggering the generation of a significant number of event-driven LSAs; as discussed above, this congests the network, and reduces the effective bandwidth (i.e., throughput) of the network.

Accordingly, there is a need for systems, methods, and devices for reducing overhead messaging, such as event-driven LSAs, in networks.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate the disclosed embodiments, and explain various principles and advantages of those embodiments.

FIGS. 6-8 are user interfaces in accordance with some embodiments.

Figure 1:
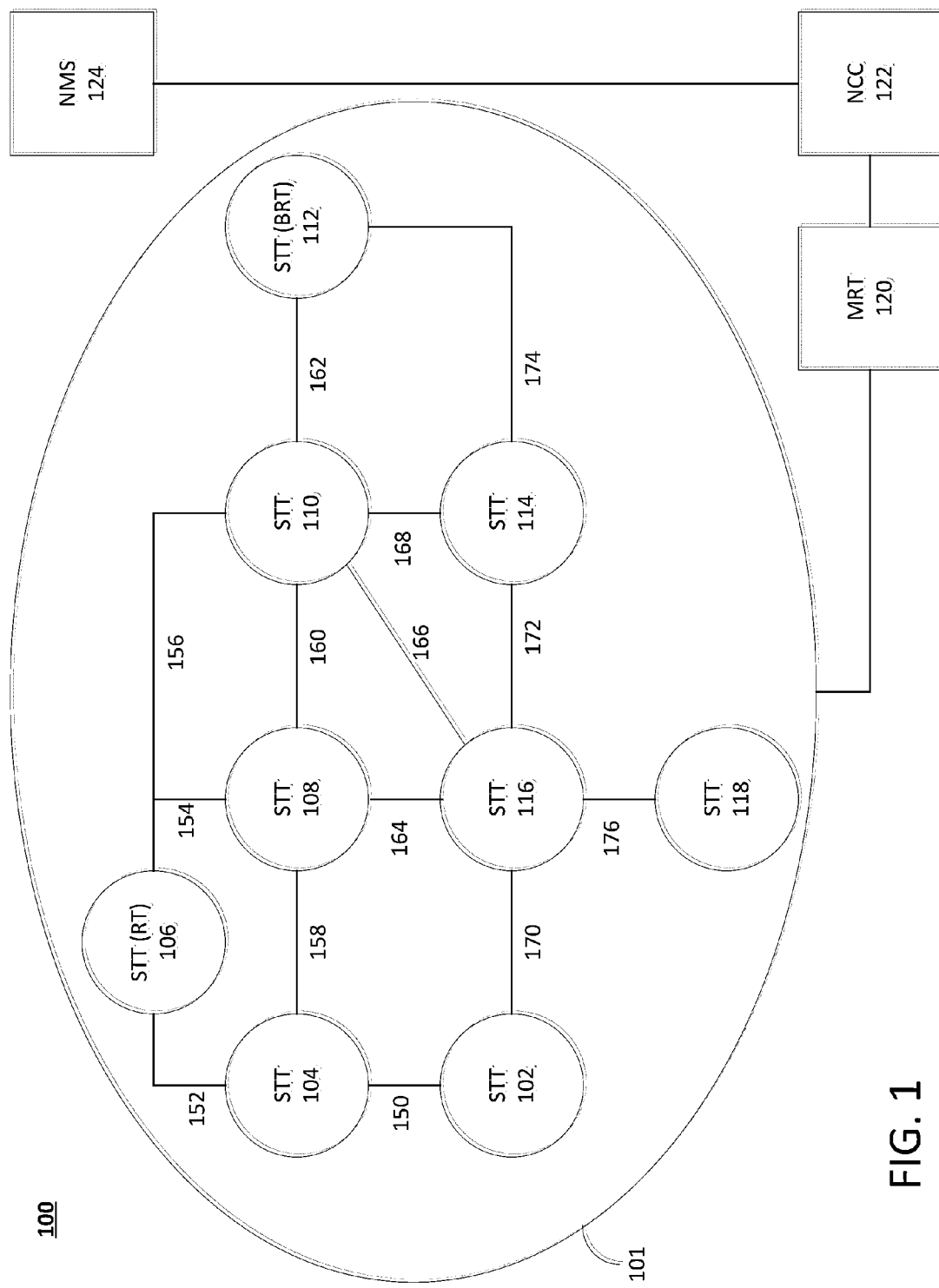
FIGS. 1, 2A, 2B, 3, and 4 are block diagrams of a satellite network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the disclosed embodiments.

The apparatus and method components have been represented where appropriate by conventional symbols in the drawings, showing only those specific details that are pertinent to understanding the disclosed embodiments, so as not to obscure the disclosure with details that will be readily apparent to those of ordinary skill in the art having the benefit of the description herein.

DETAILED DESCRIPTION

The illustrative embodiments described in the detailed description, drawings, and claims are not meant to be limiting. Other embodiments may be utilized, and other changes may be made, without departing from the scope of the disclosure. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts, and accompanying written description. While these details are helpful to explain one or more embodiments, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

Systems, methods, and devices for reducing overhead messaging such as event-driven LSAs in networks are disclosed. Embodiments of such systems, methods, and devices generate a simplified link-topology map from a comprehensive link-topology map. Further, the comprehensive link-topology map may be representative of the links among a plurality of networked satellite-traffic terminals (STTs). In addition, embodiments of such systems, methods, and devices generate, based at least in part on the simplified link-topology map, an STT-specific set of link state advertisement (LSA)-transmission instructions for each STT in the plurality. Moreover, at least one such set of LSA-transmission instructions directs the corresponding STT to transmit LSAs on less than all of the links that extend in the comprehensive link-topology map from the corresponding STT. Also, embodiments of such systems, methods, and devices transmit the respective sets of LSA-transmission instructions to the respective STTs for which the sets were generated.

FIG. 1 is a block diagram of a satellite network 100 that reduces overhead messaging in accordance with some embodiments. The satellite network 100 includes a network of satellite traffic terminals (STTs) 101 as well as a master reference terminal (MRT) 120 and a network control center (NCC) 122. The network of satellite traffic terminals includes nine STTs (STT1-STT9) (102-118) coupled to each other through various satellite links (150-176) via a satellite or multiple satellites (not shown). A variety of different satellite architectures and satellite beam configurations (e.g. single beam, multiple beams) may be employed to relay the signals among the STTs in the satellite network 100. For example, the satellite network 100 may include a "bent-pipe" satellite that receives an uplink signal from an STT, performs frequency translation to the downlink frequency, amplifies the translated signal, and then transmits the amplified downlink signal to the appropriate STT. As another example, the satellite network 100 may include a regenerative satellite that demodulates and remodulates the signals.

In one embodiment, each STT may be a multi-carrier, multi-rate, time-division multiple access (TDMA), very small aperture terminal (VSAT)-like platform that is capable of communicating with satellites. The network 101 may be managed such that satellite bandwidth can be automatically allocated between pairs of STTs based on dynamically measured traffic levels between STTs or on a fixed-assignment basis. Although an example topology of network 101 is shown in FIG. 1, other topologies may include a mesh topology, grid topology, star topology, hybrid topologies or any other topology known in the art. Further, each STT may include multiple antenna and RF-transceiver configurations to support each STT's various functions. In addition, an STT may include a satellite modem and Internet Protocol (IP) interfaces. Moreover, an STT may be coupled to a land-based network through a land-based router (See FIG. 5). And certainly other arrangements could be used instead.

In various embodiments, the NCC 122 provides signaling and control functions to the STTs (102-118). The NCC 122 is a computing device (e.g., workstation) that includes a platform for a Network Management System (NMS) 124 server. The NMS 124 provides graphical user interface (GUI) access via a web browser, coupled to the NCC 122, through which a network operator (user) configures the network 101 and requests information from the NCC 122. Upon configuring the network 101 or by receiving link-state information from the STTs (102-118), the NCC 122 may generate a comprehensive link-topology map of the network 101 that is representative of the links among the STTs (102-118) in the network 101. Further, a network operator may monitor network status and performance as well as perform modifications to the network 101 from the NMS 124. Further, the NCC 122 is coupled to a master reference terminal (MRT) 120. The MRT 120 exchanges timing and resource allocation information for the network 101 between the NCC 122 and the STTs (102-118). The MRT may communicate to the STTs (102-118) over a signaling channel within a time slot of the TDMA scheme implemented by the satellite network 100. In one embodiment, the MRT 120 is in a hub-and-spoke topology with the STTs (102-118) such that the MRT 120 is the hub and the MRT has a respective (logical) point-to-point link to each STT, each link being a spoke. Each STT may generate periodic keep-alive messages and transmit such keep-alive messages to the MRT 120, which relays the keep-alive messages to the NCC 122. Further, the NCC 122 may process the keep-alive messages to generate and update the current comprehensive link-topology map of the network 101 such that the comprehensive link-topology map is representative of the current state of the links among the STTs in the network 101. Although a proprietary protocol may be used to exchange signaling and control information between the STTs (102-118) and the NCC 122 over the signaling or control channel, other signaling protocols that are known in the art may be used (e.g., Simple Network Management Protocol (SNMP)).

The STTs (102-118) may implement Transport Control Protocol/Internet Protocol (TCP/IP) to relay traffic between one another. Further, each STT may use the Open Shortest Path First (OSPF) routing protocol to generate routing tables to route TCP/IP traffic data throughout the network 101. (Each STT can be called a router for TCP/IP traffic data in network 101). As shown in FIG. 1, each STT in the network 100 may have one or more links (150-176) that connect to other STTs. Further, each STT may generate an event-driven link state advertisement (LSA) that is provided to the other STTs in the network 101. Such an event-driven LSA provides updated information regarding a state of each of the links of the STT generating the event-driven LSA. An STT may generate an event-driven LSA when a link of that STT faults (e.g., due to malfunction, disconnection, maintenance, etc.). Based on the receipt of the event-driven LSAs, each router may implement a shortest path algorithm (e.g., Dijkstra's algorithm) to determine a shortest route from that STT to every other STT in the network 101.

Event-driven LSAs may congest network 101 as links and STTs in the network fault due to malfunction or due to management operations by a network operator (via NCC 122 or NMS 124), and/or due to one or more other reasons. Such management operations may include reconfiguring (e.g., setting up and tearing down) links on an STT or conducting maintenance (powering down STTs or links), as examples. Such events may occur often, thereby generating a significant amount of event-driven LSAs, congesting the network, and reducing bandwidth and throughput.

Conventional operation of OSPF directs each STT (102-118) in the network 101 to generate an event-driven LSA and transmit the event-driven LSA to each and every other STT. This often results in one or more event-driven LSAs being delivered to a given STT several times, each time by a different neighboring STT. For example, if STT 102 generates an event-driven LSA due to a fault, then STT 102 may transmit the event-driven LSA to both STT 104 and STT 116 via links 150 and 170, respectively. Further, STT 108 receives the event-driven LSA originated from STT 102 from both STT 104 and STT 116 via links 158 and 164, respectively. Such current operation of OSPF results in inefficient use of limited satellite network bandwidth. Thus, the systems, methods, and devices described herein reduce the number of event-driven LSAs traversing the network via the satellite links, thereby increasing overall network throughput for TCP/IP traffic data.

Figure 2A:
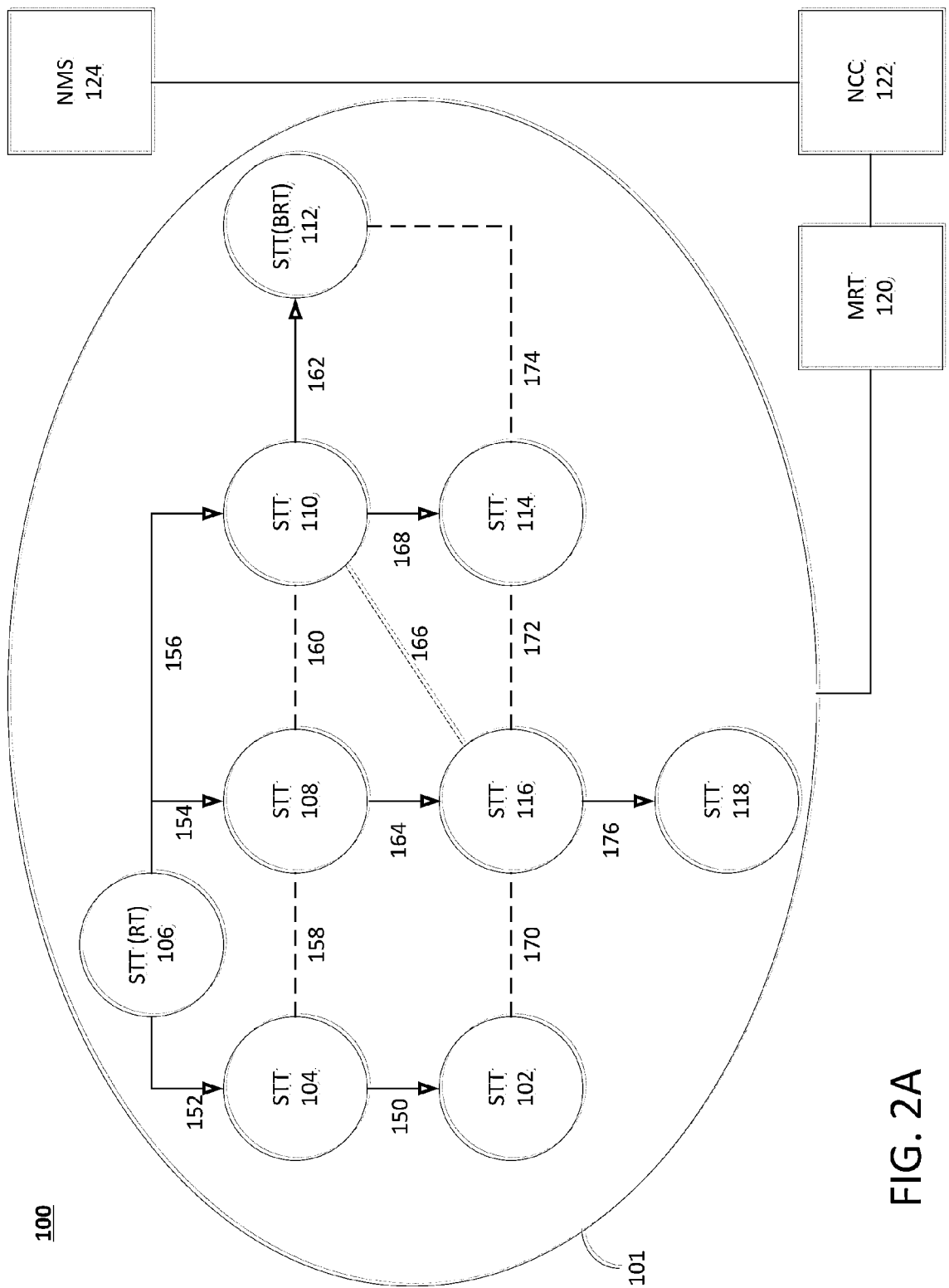

FIG. 2A shows the same satellite network 100 as shown in FIG. 1. However, the satellite network 100 of FIG. 2A implements embodiments of the present systems, methods, and devices to reduce overhead messaging, such as event-driven LSAs, in the network 101. A network operator, through an NMS 124/NCC 122, may designate one of the STTs through a user interface on the NMS 124 as a reference STT (RT). A reference STT is a focal point or fulcrum in the network 101 for distributing event-driven LSAs to other STTs in the network 101. In FIG. 2A, STT 106 is the RT. Event-driven LSAs originating from any STT in the network 101 are first directed toward the RT 106. Further, the RT 106 then delivers the event-driven LSA to every other STT in the network 101. As such, the RT 106 should have at least one routing path to every other STT in the network 101. Due to the RT 106 being a focal point or fulcrum in delivering event-driven LSAs to other STTs in the network 101, a network operator may choose (as the RT) a stable STT that (i) is substantially always in working operation (e.g., such as an STT in a hub site) and that (ii) has many adjacent STTs (i.e., has point-to-point links with a relatively high number of STTs). Further, the network operator, via the NCC/NMS (122, 124) and over the MRT 120, may also designate a backup reference STT (BRT) for the network 101. In FIG. 2A, STT 112 is the BRT. The BRT 112 takes over functions of the RT 106 in an event that the RT 106 faults (e.g., malfunction, power down, etc.). Thus, the same considerations made when choosing an RT may also be made when choosing a BRT (e.g., stable, hub site, point-to-point links with a relatively high number of other STTs in the network, etc.).

In an embodiment, the NCC 122 receives keep-alive messages from the each STT (102-118) in the network 101. By processing the keep-alive messages, the NCC can generate a current comprehensive link-topology map of the STTs in the network 101. (See FIG. 1). In at least one embodiment, the NCC 122 generates a simplified link-topology map with respect to the RT 106. In at least one such embodiment, the simplified link-topology map is generated by conducting a graph search of the comprehensive link-topology map with respect to the RT 106. In at least one such embodiment, a graph search such as a breadth-first graph search may be implemented. The breadth-first graph search is a search that involves inspecting a node in a graph and then inspecting each neighboring node of the currently inspected node. Thus, by starting the search at a root node, the search inspects all neighboring nodes of the root node. Further, for each neighboring node in turn, the search inspects each and every nodes' neighboring nodes which are uninspected and so on, as known to those of skill in the art.

Figure 12:
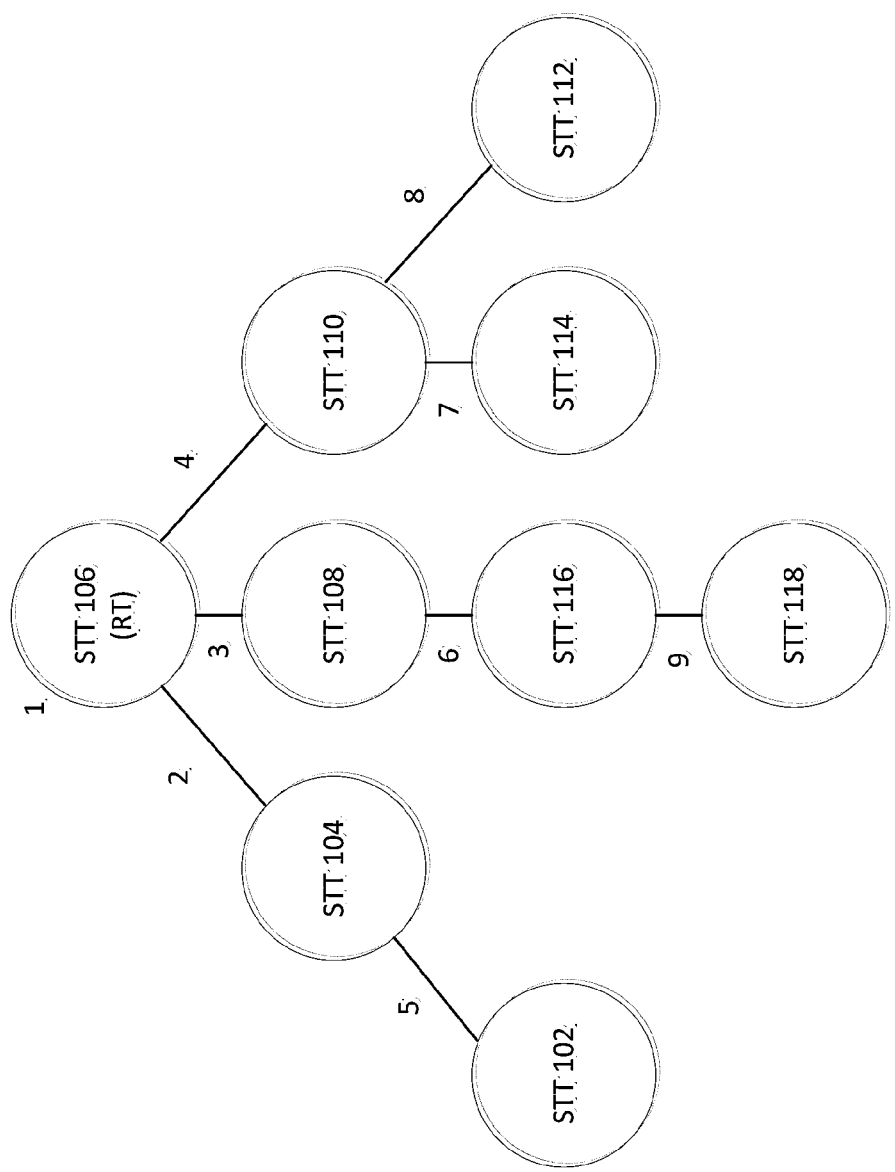
FIG. 12 is a block diagram that illustrates a breadth-first graph search in accordance with some embodiments.

Referring briefly to FIG. 12, an example implementation of a breadth-first graph search is shown using the STTs (102-118) in network 101. STT 106 is the root node and is thus the first node to be inspected/searched. Further, each neighbor of STT 106 is inspected/searched, such that STT 104, STT 108, and STT 110 are the second, third, and fourth STTs to be inspected/searched/visited, respectively. Next, each neighbor of STT 104 is inspected/searched such that STT 102 is the fifth STT to be inspected/searched. Thereafter, each neighbor of STT 108 is inspected/searched such that STT 116 is the sixth STT to be inspected/searched. Subsequently, each neighbor of STT 110 is inspected/searched, such that STT 114 and STT 112 are the seventh and eighth STTs, respectively, that are inspected/searched. Next, each neighbor of STT 116 is inspected/searched such that STT 118 is the ninth STT to be inspected/searched. Thus, FIG. 12 shows aspects of a simplified link-topology map (of a network 101 as shown in FIG. 2A) that was generated from a comprehensive link-topology map as shown in FIG. 1.

Referring back to FIG. 2A, upon designating STT 106 as the RT, the NCC 122 generates a simplified link-topology map from the comprehensive link-topology map (See FIG. 1) by conducting the a breadth-first graph search with RT 106 as the root node. (The simplified link-topology map is shown with links in solid lines while links in dashed lines are links from the comprehensive link-topology map that are not used in the simplified link-topology map). Further, the NCC 122 generates, based at least in part on the simplified link-topology map, an STT-specific set of link state advertisement (LSA)-transmission instructions for each STT in network 101. At least one such set of LSA-transmission instructions directs the corresponding STT to transmit LSAs on less than all of the links that extend in the comprehensive link-topology map from the corresponding STT. For example, FIG. 2A shows STT 104 directed to transmit LSAs on the link 150 to STT 102, but not to transmit LSAs on the link 158 to the STT 108. In addition, the NCC 122 transmits the respective sets of LSA-transmission instructions to the respective STTs.

Figure 2B:
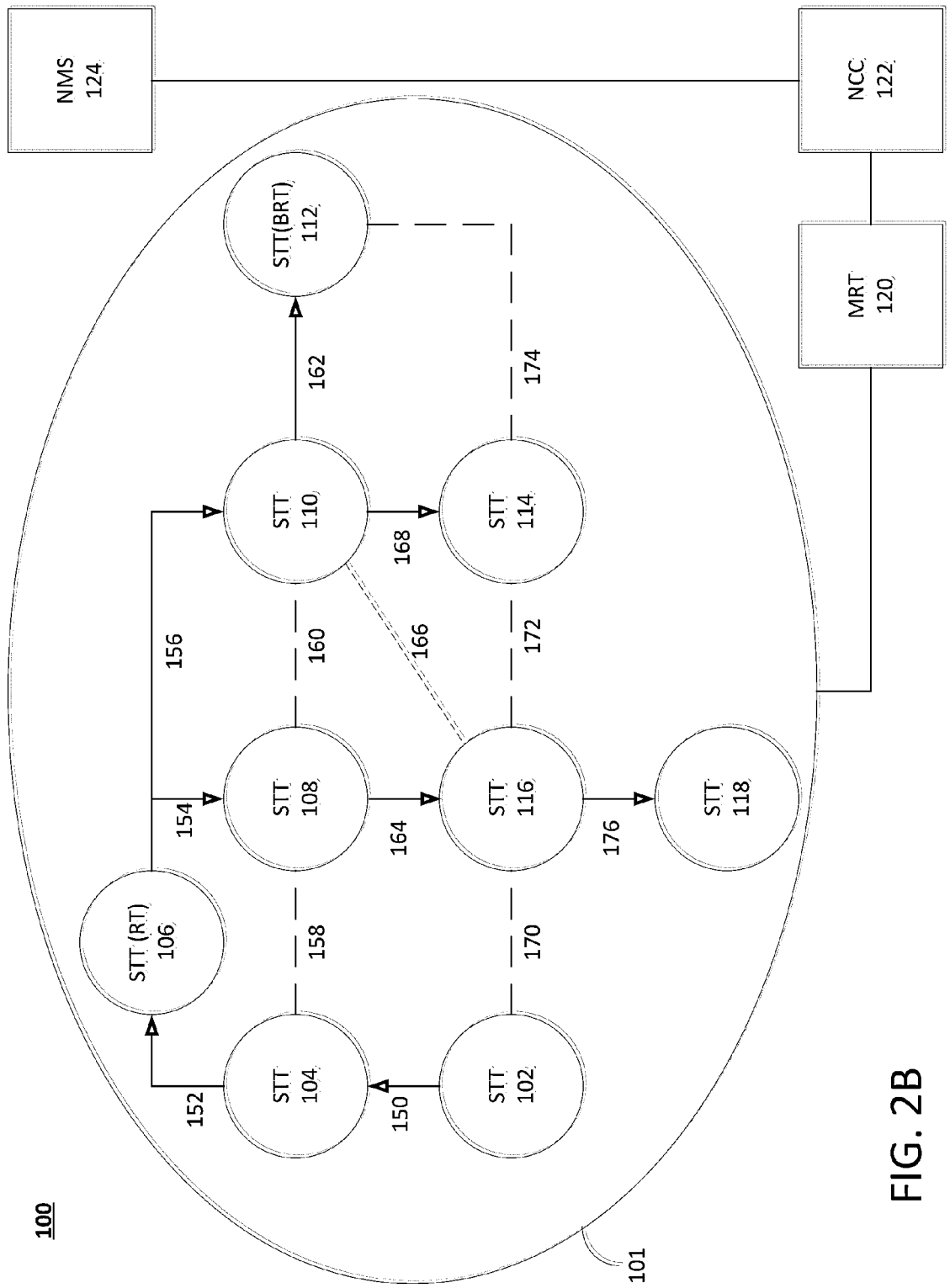

FIG. 2B shows an example of an event-driven LSA originating from STT 102. Upon generating an event-driven LSA, STT 102 transmits the event-driven LSA toward the RT 106 based on the STT-102-specific LSA-transmission instructions from the NCC 122. That includes first transmitting the event-driven LSA to STT 104 over link 150. Further, STT 104 stores the event-driven LSA originated and received from STT 102 and updates its routing table according to the OSPF routing protocol. In addition, STT 104 transmits the event-driven LSA originated from STT 102 to the RT 106 over link 152 in accordance with the STT-104-specific LSA-transmission instructions. Upon receipt of the event-driven LSA originated from STT 102 and received from STT 104 over link 152, the RT 106 transmits the event-driven LSA to every other STT in the network according to the RT-106-specific LSA-transmission instructions. (See FIG. 2A) That includes transmitting the event-driven LSA to STT 108 and STT 110 over links 154 and 156, respectively. However, the RT 106 does not deliver the event-driven LSA to STT 104 because the RT 106 had just received that event-driven LSA from STT 104. Transmitting the event-driven LSA right back to the STT 104 would be an inefficient use of network bandwidth. Thus, the RT 106 is configured to recognize not to transmit the event-driven LSA along the routing path from which the RT 106 received the event-driven LSA. And whether or not the RT 106 is configured specifically to not send event-driven LSAs right back to the STT from which RT 106 received the event-driven LSA is immaterial; this is an implementation choice, as the LSA-transmission instruction sets sent by the NCC 122 to the various STTs (including the RT 106) would inherently prevent such inefficient communication from occurring.

Further, upon receiving the event-driven LSA from the RT 106, STT 108 transmits the event-driven LSA to STT 116 over link 164 according to the STT-108-specific LSA-transmission instructions received by STT 108 from the NCC 122. In addition, upon receiving the event-driven LSA from the RT 106, STT 110 transmits the event-driven LSA to STT 112 and to STT 114 over links 162 and 168 according to the STT-110-specific LSA-transmission instructions. Also, upon receiving the event-driven LSA from STT 108, STT 116 transmits the event-driven LSA to STT 118 over link 176 according to the STT-116-specific LSA-transmission instructions. Thus, each STT in the network 101 receives the event-driven LSA originated from STT 102 without inefficient use of network bandwidth due to a reduction of overhead messaging such as event-driven LSAs in the network 101 when compared to the conventional implementation of the OSPF routing protocol.

Figure 3:
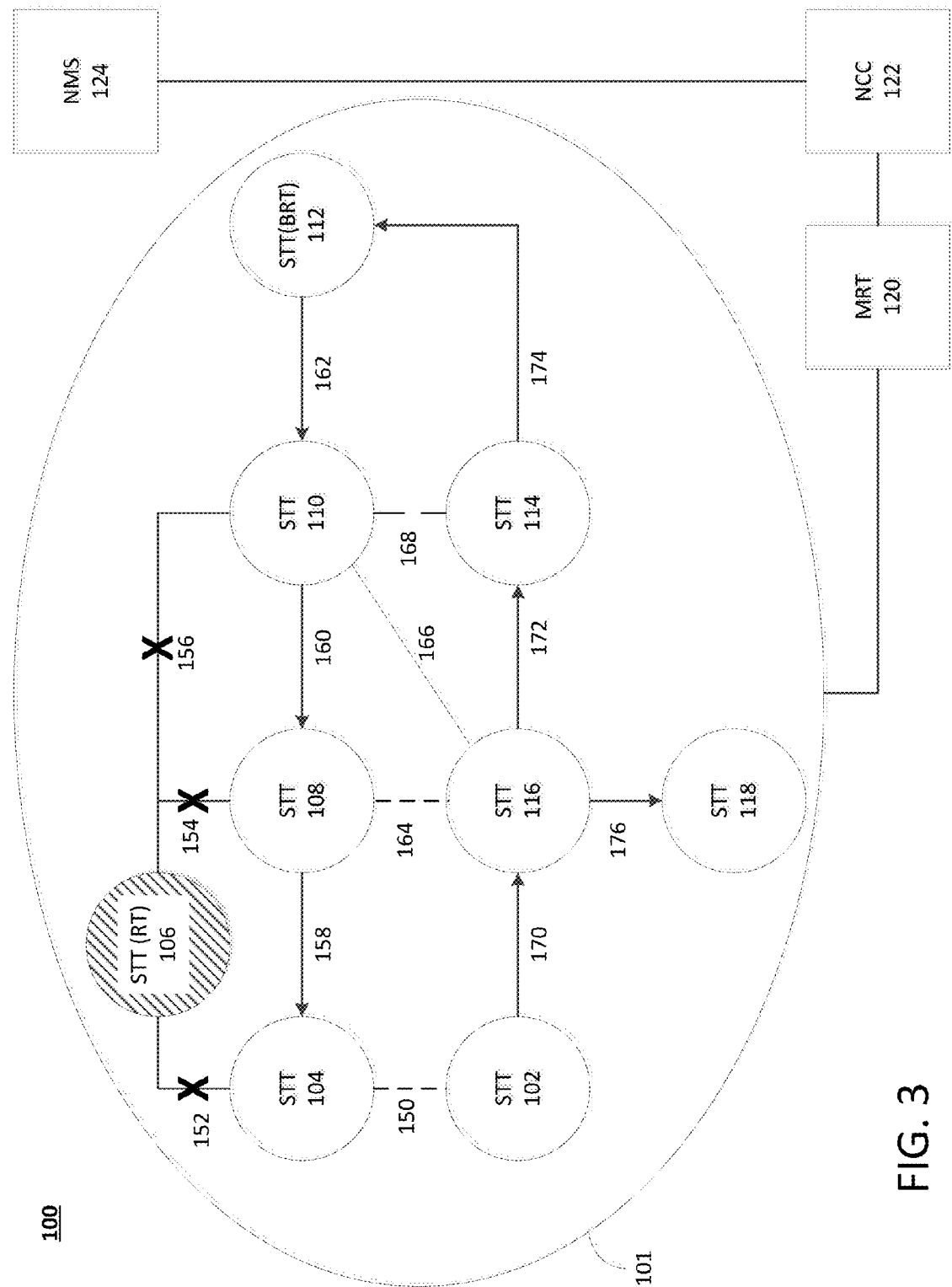

FIG. 3 is a block diagram of a satellite network 100 that reduces overhead messaging in accordance with some embodiments. The satellite network 100 is the same as the satellite network shown in FIGS. 1, 2A, and 2B, however, in FIG. 3, the RT 106 has faulted (e.g., malfunction, powered down, etc.). The NCC 122 may determine that the RT 106 has faulted because a timeout has occurred. That is, the elapsed time from when the NCC 122 received a previous keep-alive message from RT 106 exceeded a predetermined threshold of time. Thus, the NCC 122 may process the occurrence of the timeout (e.g., RT 106 faulted) to update the comprehensive link-topology map as well as to update the simplified link-topology map by conducting a graph search with the BRT or pre-determined backup reference STT 112. Upon generating the updated simplified link-topology map, the NCC 122 sends updated STT-specific LSA-transmission instructions to the STTs (102-118) in the network 118 to send event-driven LSAs toward the BRT 112, which will in turn deliver the event-driven LSAs to every other STT in the network 101 that has yet to receive them.

For example, STT 102 may originate/generate an event-driven LSA (e.g., due to a link fault, etc.) and then, based on the LSA-transmission instructions received previously from the NCC 122, transmit the event-driven LSA toward the BRT 112. The event-driven LSA is first transmitted to the STT 116 over link 170. Further, upon receipt, STT 116 stores the event-driven LSA from STT 102 and updates its routing table according to the OSPF routing protocol. In addition, STT 116 transmits the event-driven LSA originated/generated from STT 102 toward the BRT 112 by transmitting the event-driven LSA to STT 114 over link 172. Upon receipt, STT 114 stores the event-driven LSA from STT 102 and updates its routing table according to the OSPF routing protocol. In addition, STT 114 transmits the event-driven LSA that was originated/generated from STT 102 to the BRT 112 over link 174.

Thereafter, upon receipt, the BRT 112 stores the event-driven LSA from STT 102 and updates its routing table according to the OSPF routing protocol. In addition, BRT 112 transmits, according to the LSA-transmission instructions, the event-driven LSA originated/generated from STT 102 to every other STT in the network 101 that has not already received the event-driven LSA from STT 102. Thus, the BRT 112 transmits the event-driven LSA to STT 110 over link 162. Upon receipt, STT 110 stores the event-driven LSA (that originated from STT 102 but was) received from BRT 112, and updates its routing table according to the OSPF routing protocol. In addition, STT 110 transmits the event-driven LSA originated/generated from STT 102 to STT 108 over link 160 according to the LSA-transmission instructions. Upon receipt, STT 108 stores the event-driven LSA (that originated from STT 102 but was) received from STT 110 and updates its routing table according to the OSPF routing protocol. Also, STT 108 transmits the event-driven LSA originated/generated from STT 102 to STT 104 over link 158 according to the LSA-transmission instructions. Upon receipt, STT 104 stores the event-driven LSA and updates its routing table.

Figure 4:
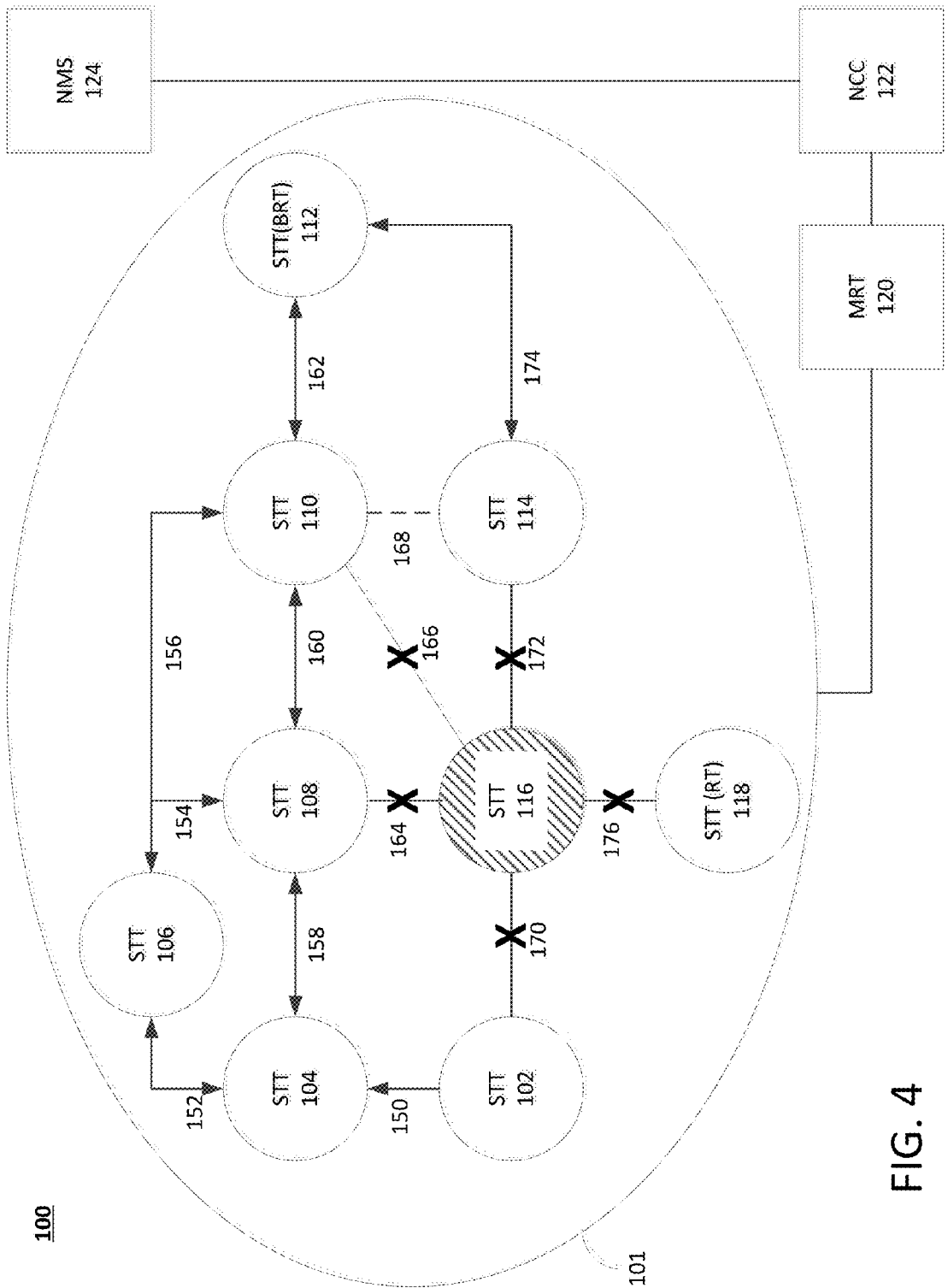

FIG. 4 is a block diagram of a satellite network. The satellite network 100 is the same as the satellite network shown in FIGS. 1, 2A, 2B and FIG. 3, however, in FIG. 4, the RT is designated to be STT 118. Further, STT 116, has faulted (e.g., malfunction, powered down, etc.) thereby isolating RT 118 from the rest of the network 101. The selection of STT 118 as the RT was not a good choice because STT 118 was not a hub site that was adjacent to several other STTs in the network 101. Thus, STT 118 was vulnerable to becoming isolated from the rest of the network 101 when STT 116 faulted. Thus, when STT 116 faulted and STT 102 originates an event-driven LSA, STT 102 has no path to the RT 118. With no path to RT 118, the other STTs (102-114) flood the event-driven LSAs based on the conventional implementation of OSPF as shown in FIG. 4.

Figure 5:
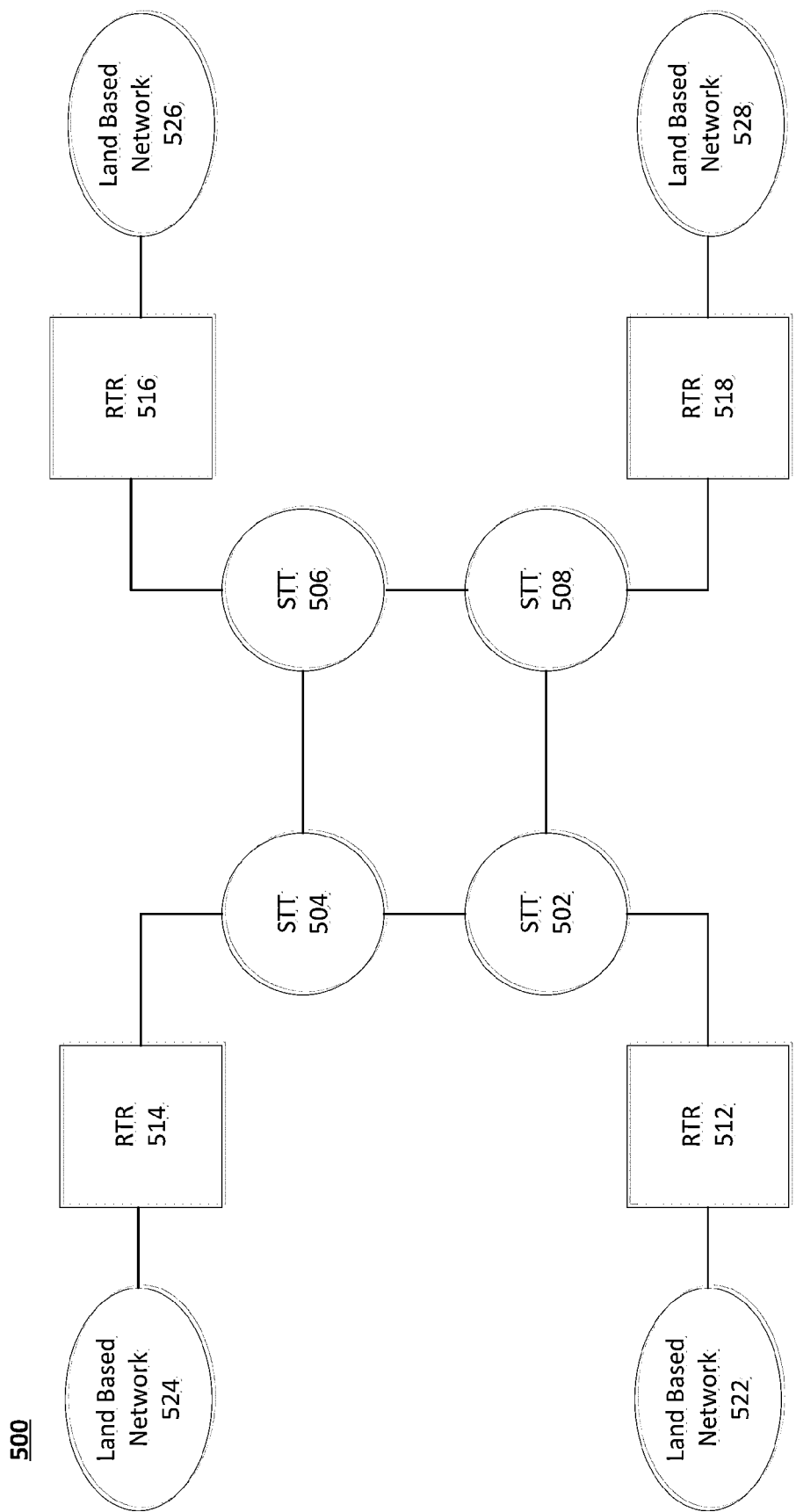
FIG. 5 is a block diagram of a network that includes a satellite network coupled to a plurality of land based networks, in accordance with some embodiments.

FIG. 5 is a block diagram of a network 500 that includes a satellite network that reduces overhead messaging, coupled to a plurality of land based networks (522-528), in accordance with some embodiments. The satellite network includes four STTs (502-508) coupled to each other over satellite links. Further, each STT (502-508) is coupled to a router (512-518). In addition, each router (512-518) is coupled to a land based network. In some embodiments, the land based networks (522-528) and the routers (512-518) may implement the OSPF routing protocol without implementing any systems, methods, and devices for reducing overhead messaging such as event-driven LSAs as described herein. However, the STTs (502-508) in the satellite network may implement such systems, methods, and devices for reducing overhead messaging such as event-driven LSAs. For example, if RTR 512 transmits an event-driven LSA to STT 502 from land based network 522, then STT 502 may forward the event-driven LSA, in accordance to the systems, methods, and devices for reducing overhead messaging as described herein. That is, STT 503 forwards the event-driven LSA toward the reference STT (as if STT 1 502 originated/generated the event-driven LSA). Upon receipt of the event-driven LSA, the reference STT delivers the event-driven LSA to every other STT in the satellite network that has not yet received the event-driven LSA from STT 502.

Figure 6:
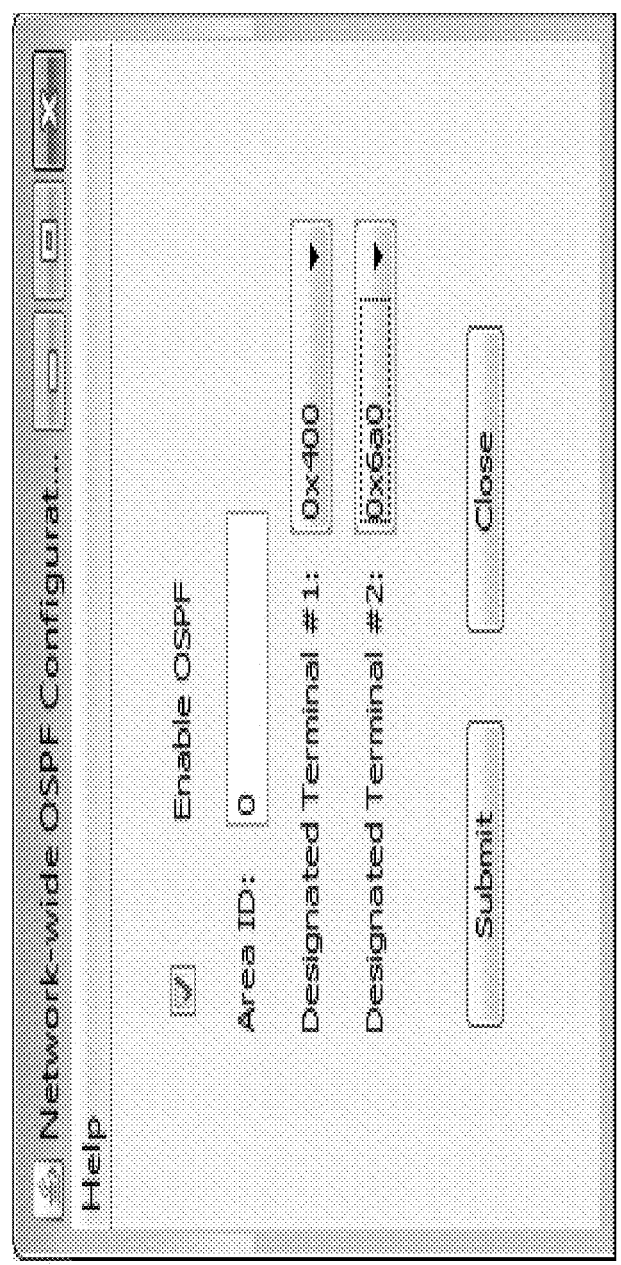

FIG. 6 is a user interface 600 used to reduce overhead messaging in a network, in accordance with some embodiments. The user interface can be called a Network-wide OSPF configuration window and may be provided by the NMS to the user. By checking the box next to "Enable OSPF" a network operator configures all STTs in the satellite network to implement OSPF including the systems, methods, and devices for reducing overhead messaging such as event-driven LSAs in the satellite network. Note, if the box is not checked, then none of the STTs in the satellite network implements OSPF including overhead messaging reduction systems, methods, and devices. The Area ID is a 32-bit integer signifying the OSPF area belonging to the satellite network. Further, the user interface 600 allows the network operator to select the address of a STT to be a reference STT as well as to select the address of another STT to be a backup reference STT. In one embodiment, network operator may enter or select two different STTs on the user interface; in such a case, the one of those two that is powered up and is operational first may become the RT. The second STT that is powered up and is operation may become the backup reference STT.

Figure 7:
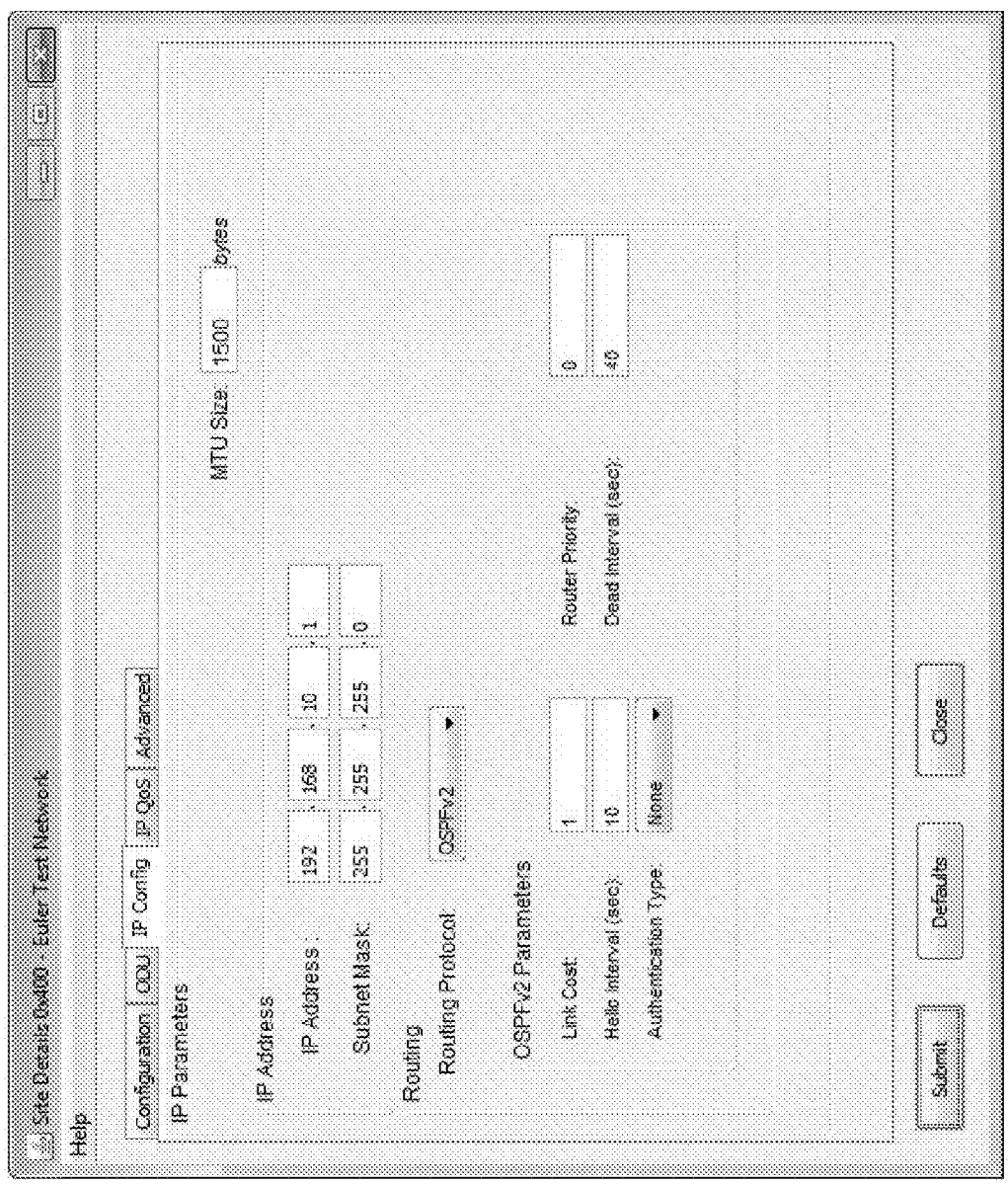

FIG. 7 is a user interface 700 to monitor the status of an STT implementing overhead messaging reduction systems, methods and devices, in accordance with some embodiments. The NCC receives control and management information across a signaling channel through the MRT. Such control and management information includes monitoring the status of each STT in the satellite network. A network operator may monitor the status of an STT using user interface 700 via the NMS. The user interface 700 shows the maximum transmission unit (MTU) to be 1500 bytes. Further, the user interface 700 lists the IP address and the subnetwork MASK of the STT. In addition, the user interface 700 indicates that the STT is implementing OSPF including the overhead messaging reduction systems, methods, and devices. Moreover, the user interface lists OSPF parameters such a link cost, router priority, hello interval, dead interval and authentication type (if any).

Figure 8:
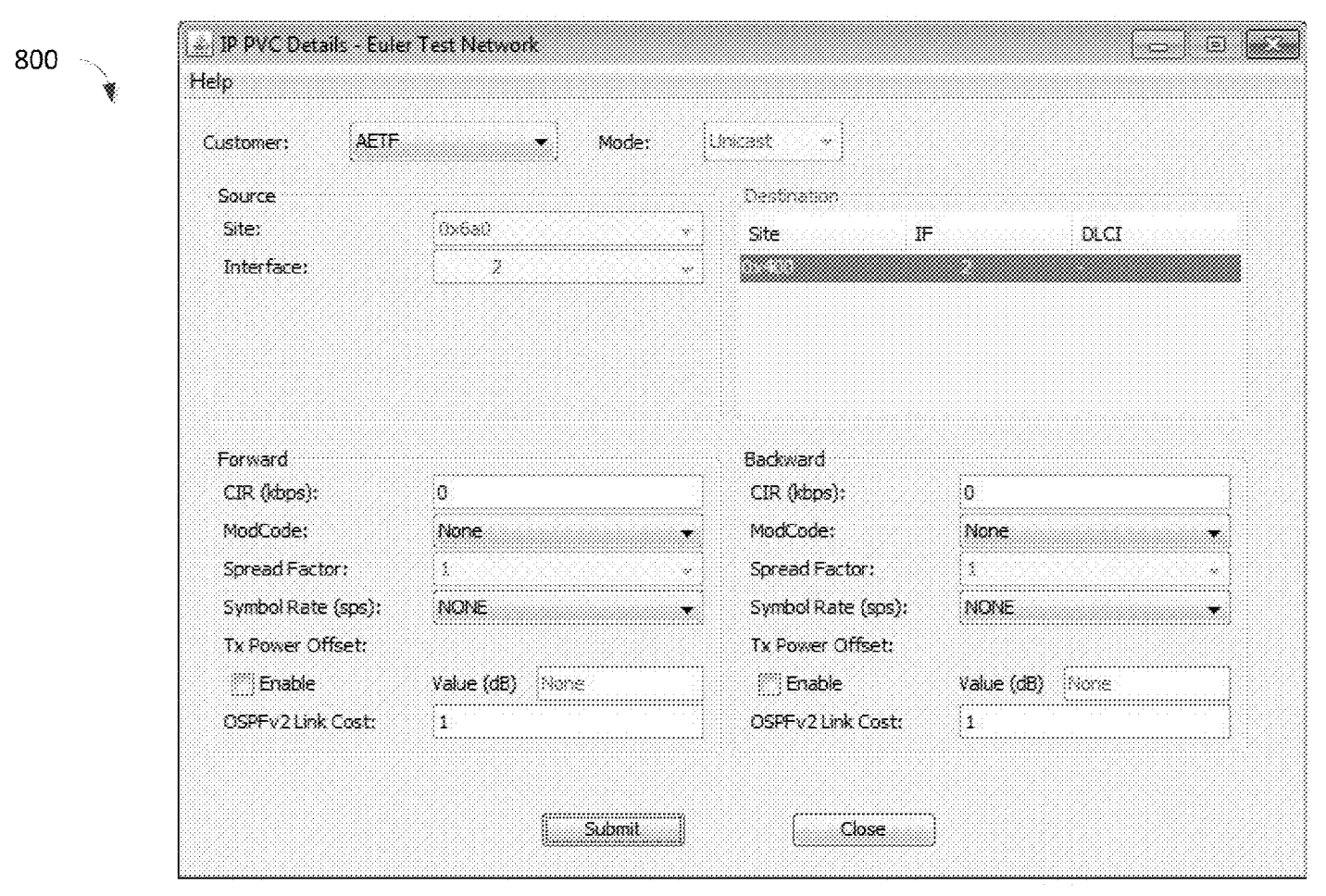

FIG. 8 is a user interface 800 that may be used as an IP permanent virtual circuit or connection (PVC) details window. A PVC is a virtual connection that a network operator sets up with static parameters when configuring a network connection. PVCs are not tied to a given physical path through the network. Bandwidth is always reserved for the PVC, whether the PVC is in use, or not, such that PVCs are always available for immediate use. The IP PVC Details window 800 allows a network operator via the NMS to configure a PVC between two STTs in the satellite network. Further, the IP PVC Details window 800 includes Forward and Backward groups of user interface controls that allow a network operator to configure parameters for the PVC link forward direction (i.e., source to destination) and the backward direction (i.e., destination to source). In addition, if the OSPF is enabled using the user interface shown in FIG. 6 (Network-wide Configuration window), the NMS prompts the network operator to provide the link cost in the forward direction as well as the link cost in the backward direction.

Figure 9:
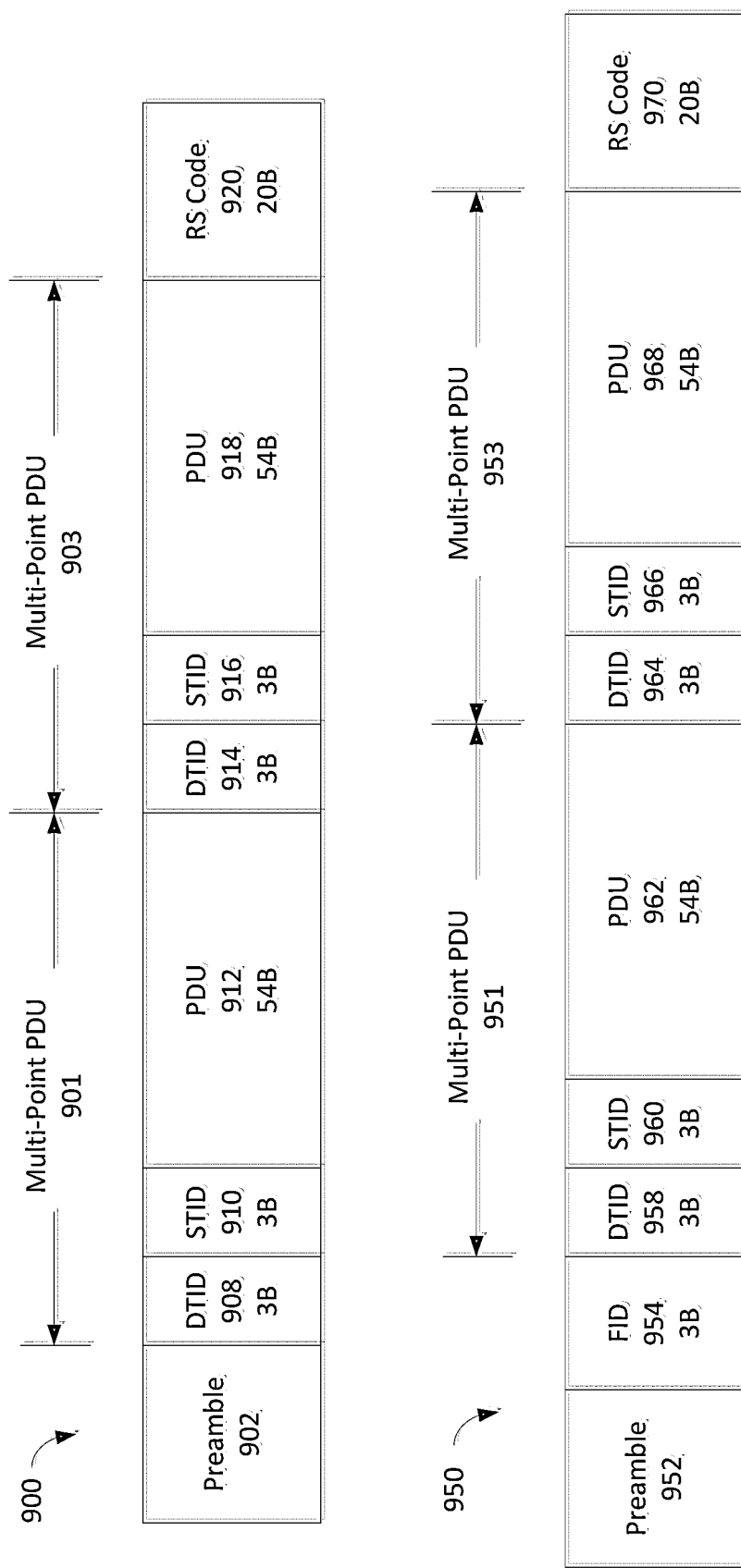
FIG. 9 shows the message formats of a Signaling Burst (SB) and a Reference Burst (RB) used to receive and transmit signaling and control information in accordance with some embodiments.

FIG. 9 shows a message format 900 of a Signaling Burst (SB) used to receive signaling and control information from an STT by an NCC that may be used to reduce overhead messaging in a network, in accordance with some embodiments. Such a SB 900 may be received by the NCC through an MRT over a random access (e.g., slotted aloha) channel. In some embodiments, the SB 900 may include a keep-alive message that notifies the NCC that an STT is still in operation thereby indicating to the NCC that the status of the current comprehensive link-topology map and simplified link-topology map remains unchanged. In other embodiments the SB 900 may contain a link state update of one or more STTs in the satellite network such that the NCC may update the comprehensive link-topology map as well as the simplified link-topology map. In the embodiment shown in FIG. 9, the SB includes a preamble 902 and two multi-point protocol data units (PDUs) (901, 903) and Reed-Solomon (RS) error correction code 920 that is 20 bytes in length. Further, each multi-point PDU (901,903) includes a destination terminal identifier (DTID) (908, 914) that is three bytes in length, a source terminal identifier (STID) (910, 916) that is also three bytes in length, and a PDU (912, 918) that is 54 bytes in length. The signaling information is carried in the PDU (912, 918) portion of the SB that may include a keep-alive message for the NCC or a link status update message such that the NCC updates the comprehensive link-topology map and the simplified link-topology map, accordingly.

Further, FIG. 9 also shows a message format 950 of a Reference Burst (SB) used to transmit signaling and control information to an STT from the NCC that may be used to reduce overhead messaging in a network, in accordance with some embodiments. The RB 950 may also be used to provide timing information to establish frame timing the TDMA satellite network. Such an RB 950 may be transmitted by the NCC to an STT through an MRT over a signaling or control channel. In some embodiments, the RB 950 may carry STT-specific set of link state advertisement (LSA)-transmission instructions for each STT in a satellite network as described herein. At least one such set of LSA-transmission instructions directs the corresponding STT to transmit LSAs on less than all of the links that extend in a comprehensive link-topology map from the corresponding STT. In the embodiment shown in FIG. 9, the RB includes a preamble 952, a frame identifier (FID) 954 and two multi-point protocol data units (PDUs) (951, 953) and Reed-Solomon (RS) error correction code 970 that is 20 bytes in length. Further, each multi-point PDU (951,953) includes a destination terminal identifier (DTID) (958, 964) that is three bytes in length, a source terminal identifier (STID) (960, 966) that is also three bytes in length, and a PDU (962, 968) that is 54 bytes in length. The signaling information is carried in the PDU (962, 968) portion of the RB 950 that may include LSA-transmission instructions for the STTs.

Figure 10:
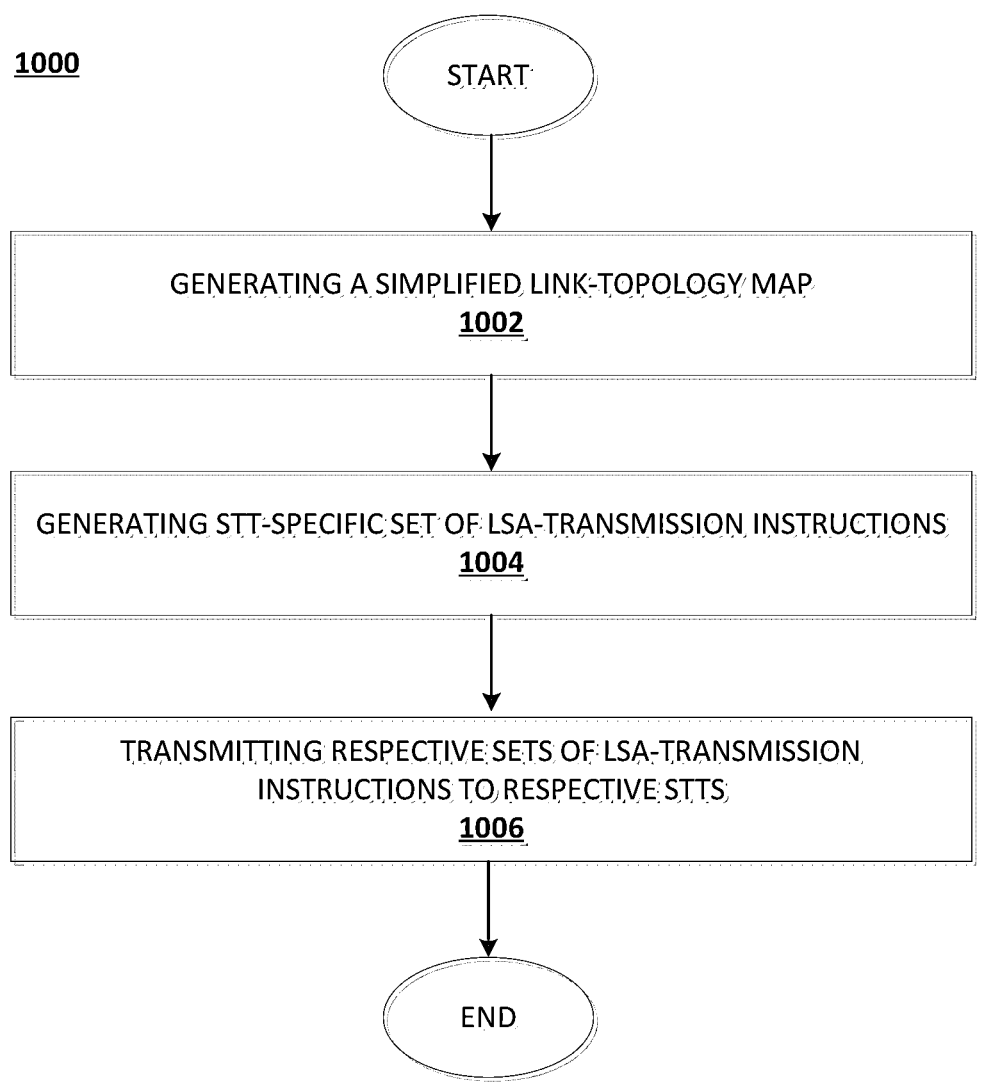
FIG. 10 is a flowchart of a method in accordance with some embodiments.

FIG. 10 is a flowchart of a method 1000 for reducing overhead messaging in a network, in accordance with some embodiments. The method 1000 includes generating a simplified link-topology map from a comprehensive link-topology map by an NCC, as shown in block 1002. The comprehensive link-topology map is representative of the links among a plurality of networked satellite-traffic terminals (STTs). The network of STTS may in a full-mesh topology, grid topology, star, topology, hybrid topologies or any other topology known in the art. The generation of the simplified link-topology map may include generating the simplified link-topology map with respect to a reference STT such that the plurality of networked STTs includes the reference STT. In one embodiment, the NCC may receive a user designation of a given STT and the NCC responsively designates the given STT as the reference STT. The user designation may be received from a user interface displayed on an NMS coupled to the NCC. Also, the generation of the simplified link-topology map with respect to the reference STT may include conducting a graph search of the comprehensive link-topology map with respect to the reference STT. An exemplary graph search may be a breadth-first graph search.

Moreover, method 1000 may carried out in response to detecting a timeout with respect to periodic keep-alive messages from a previous reference STT. Also, the reference STT may be a pre-determined backup with respect to the previous reference STT.

Further, the method 1000 includes the NCC generating, based at least in part on the simplified link-topology map, an STT-specific set of link state advertisement (LSA)-transmission instructions for each STT of the one or more STTS in the network, as shown in block 1004. At least one such set of LSA-transmission instructions directs the corresponding STT to transmit LSAs on less than all of the links that extend in the comprehensive link-topology map from the corresponding STT as described herein. The generated sets of LSA-transmission instructions collectively instruct the STTs to route all LSAs towards the reference STT.

In addition, the method 1000 includes the NCC transmitting the respective sets of LSA-transmission instructions to the respective STTs for which the sets were generated, as shown in block 1006. The transmission of the respective sets of LSA-transmission instructions to the respective STTs for which the sets were generated includes transmitting the respective sets of LSA-transmission instructions via respective control-channel links or signaling channel links with the respective STTs to the NCC (through an MRT).

In some embodiments, the method 1000 may be carried out in response to receiving one or more link state updates (LSUs) from one or more of the STTs in the plurality. Such LSUs may be received via respective control-channel or signaling channel links with the respective STTs to the NCC (through an MRT). In other embodiments, method 1000 may be carried out in response to detecting a timeout with respect to periodic keep-alive messages from one or more of the STTs in the plurality. Such keep-alive messages may be received by the NCC via respective control-channel or signaling channel links with the respective STTs (through the MRT).

Figure 11:
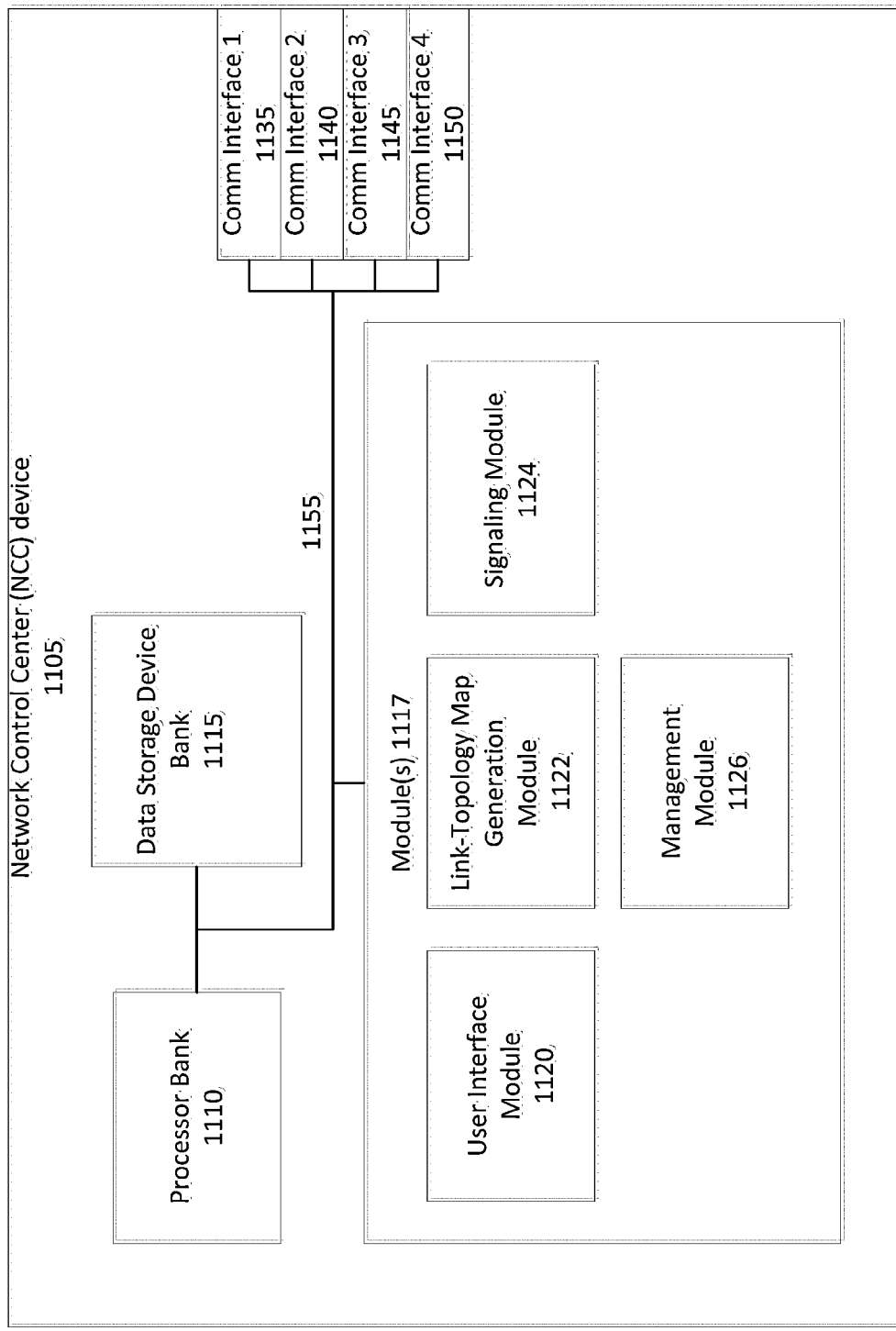
FIG. 11 is a block diagram of a Network Control Center (NCC) device in accordance with some embodiments.

FIG. 11 is a block diagram 1100 of a Network Control Center (NCC) device 1105, in accordance with some embodiments. Such embodiments of NCC device 1105 may be used in a system shown in FIGS. 1-4. The NCC 1105 may be a computing device such as a workstation or computer server. The device 1105 may include several different components such as a processor bank 1110, data storage device bank 1115, one or more software applications, which may be executed by a processor form specifically-configured module devices 1117, and one or more communication interfaces (1135-1150). The processor bank 1110 may include one or more processors that may be co-located with each other or may be located in different parts of the NCC device 1105. The data storage device bank 1115 may include one or more storage devices. Types of data storage devices may include memory devices, electronic memory, optical memory, and removable storage media. The data storage devices may contain instructions executable by a processor for causing the NCC to carry out a set of functions. Such functions may be carried out by one or more modules. Further, the one or more modules 1117 may include a user interface module 1120, link-topology map generation module 1122, signaling module 1124, and a management module 1126. The modules 117 may be implemented by the one or more processors in the processor bank 1110.

The user interface module 1120 provides instructions to the NCC device 1105 or to an NMS coupled to the NCC device 1105 (over one of the communication interfaces (1135-1150) to display a user interface. Such user interfaces may be the Network-wide OSPF configuration window shown in FIG. 6, the current STT IP Interface configuration window shown in FIG. 7, and IP PVC Details window shown in FIG. 8. Further, the user interface module 1120 receives user input data entered into the user interface by a network operator (e.g., user). The user interface may then transmit the user input data to other modules 117 for further processing.

The link-topology map generation module 1122 may generate a comprehensive link-topology map such that the comprehensive link-topology map is representative of the links among one or more networked STTs. The network of STTs may be in a full-mesh topology, grid topology, star, topology, hybrid topologies or any other topology known in the art. A network operator may input the links among the networked STTs or the NCC device 1105 may receive signaling information from each of the STTs that provides link information for the link-topology map generation module 1122 to generate the comprehensive link-topology map. Such signaling information may be provided by the signaling module 1124.

Further, the link-topology map generation module 1122 may receive user input data from the user interface module 1120 such that the NCC device 1105 can implement systems, methods, and devices to reduce overhead messaging, such as event-driven LSAs, in the network of STTs. In response to such user input data, the link-topology map generation module may generate a simplified link-topology map from the comprehensive link-topology map. The generating of the simplified link-topology map may include generating the simplified link-topology map with respect to a reference STT which is one of the networked STTs. A network operator may provide user input data through a user interface (from the NMS) that includes designating a given STT as a reference STT as well as designating another given STT as a backup reference STT. Such user input data may be received by the user interface module 1120 and forwarded to the link-topology map generation module 1122. In response to the user designation, the link-topology map generation module 1122 designates the given STT as the reference STT and the other given STT as the pre-determined back reference STT.

In addition, the generation of the simplified link-topology map with respect to the reference STT comprises conducting a graph search of the comprehensive link-topology map with respect to the reference STT. In some embodiments, the graph search may be a breadth first search. However, other graph search methods may be used to generate the simplified link-topology map.

The management module 1126 may generate, based at least in part on the simplified link-topology map, an STT-specific set of link state advertisement (LSA)-transmission instructions for each STT in the network. At least one such set of LSA-transmission instructions directs the corresponding STT to transmit LSAs on less than all of the links that extend in the comprehensive link-topology map from the corresponding STT. Further, the management module 1126 causes the NCC device 1105 to transmit the respective sets of LSA-transmission instructions to the respective STTs. In some embodiments, the respective sets of LSA-transmission instructions to the respective STTs for which the sets were generated includes transmitting the respective sets of LSA-transmission instructions via respective control-channel links with the respective STTs over the one or more communication interfaces (1135-1150). In addition, the generated sets of LSA-transmission instructions collectively instruct the STTS to route all LSAs towards the reference STT.

In some embodiments, the set of functions implemented by the link-topology map generation module 1122 and the management module 1126 may be carried out in response to receiving one or more link state updates (LSUs) from one or more of the STTs. In further embodiments, the NCC device 1105 may receive the one or more LSUs from one or more of the STTs via respective control-channel links with the respective STTs.

In other embodiments the set of functions implemented by the link-topology map generation module 1122 and the management module 1126 may be carried out in response to detecting a timeout with respect to periodic keep-alive messages from one or more of the STTs. That is, the management module 1126 may execute a timer based on a last receipt of a keep-alive massage from a respective STT. When the timer expires (e.g., timeout), the set of functions implemented by the link-topology map generation module and management module 1126 may be carried out. In additional embodiments, the set of functions implemented by the link-topology map generation module 1122 and the management module 1126 may be carried out in response to detecting a timeout with respect to periodic keep-alive messages from a previous reference STT. Thus, the generation of the simplified link-topology map is conducted such that the reference STT is the pre-determined backup with respect to the previous reference STT.

The signaling module 1124 transmits and receives signaling or control information from STTs in the network over one of the communication interfaces (1135-1150). Such signaling or control information may be the receipt of keep-alive messages from each STT in the network. The signaling module 1124 may receive the keep-alive messages in a signaling burst (SB) (See FIG. 9). Further, the signaling module 1124 may transmit the STT-specific set of link state advertisement (LSA)-transmission instructions to each STT in the network. The signaling module 1124 may provide the signaling information in a reference burst (RB) (See FIG. 9). Such an RB carries signaling information from the NCC device 1105 to each STT. The signaling information may be provided by the signaling module 1124 in the SB over a signaling or control channel that is a random access (slotted aloha) or other time slot in a TDMA satellite network. In other embodiments, the keep-alive messages and STT-specific set of link state advertisement (LSA)-transmission instructions may be sent using different signaling and control protocols such as SNMP.

Each of the communication interfaces (1135-1150) may be software or hardware associated in communicating to other devices. The communication interfaces (1135-1150) may be of different types that include a user interface, USB, Ethernet, WiFi, WiMax, wireless, satellite, optical, cellular, or any other communication interface coupled to a communication network. Further, the communication interfaces (1135-1150) may be signaling or control channel links between the NCC device 1105 and to each STT (through the MRT).

An intra-device communication links 1155 between the processor bank 1110, storage device bank 1115, modules 1117, and communication interfaces (1135-1150) may be one of several types that include a bus or other communication mechanism.

In the foregoing specification, specific embodiments have been described. However, one of ordinary skill in the art appreciates that various modifications and changes can be made without departing from the scope of the claims. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as critical, required, or essential.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   generating a simplified link-topology map from a comprehensive link-topology map, wherein the comprehensive link-topology map is representative of node to node links among a plurality of networked satellite-traffic terminals (STTs) including a reference STT, wherein generating the simplified link-topology map comprises generating the simplified link-topology map with respect to a reference STT, and wherein the simplified link-topology map is representative of a simplified set of links that connect the reference STT to each of the other STTs of the plurality, either directly or indirectly through one or more other STTs of the plurality, and wherein the number of links in the simplified set of links is smaller than the number of links in the comprehensive link-topology map;
   generating, based at least in part on the simplified link-topology map, an STT-specific set of link state advertisement (LSA)-transmission instructions for each STT in the plurality, wherein at least one such set of LSA-transmission instructions directs the corresponding STT to transmit LSAs on less than all of the links that extend in the comprehensive link-topology map from the corresponding STT; and
   transmitting the respective sets of LSA-transmission instructions to the respective STTs for which said sets were generated.

2. The method of claim 1, wherein transmitting the respective sets of LSA-transmission instructions to the respective STTs for which said sets were generated comprises transmitting the respective sets of LSA-transmission instructions via respective control-channel links with the respective STTs.

3. The method of claim 1, carried out in response to detecting a timeout with respect to periodic keep-alive messages from one or more of the STTs in the plurality.

4. The method of claim 1, wherein generating the simplified link-topology map with respect to the reference STT comprises conducting a graph search of the comprehensive link-topology map with respect to the reference STT.

5. The method of claim 4, wherein the graph search is a breadth-first search.

6. The method of claim 1, further comprising receiving a user designation of a given STT and responsively designating the given STT as the reference STT.

7. The method of claim 1, wherein the generated sets of LSA-transmission instructions collectively route all LSAs towards the reference STT.

8. The method of claim 1, carried out in response to detecting a timeout with respect to periodic keep-alive messages from a previous reference STT.

9. The method of claim 8, wherein the reference STT is a pre-determined backup with respect to the previous reference STT.

10. The method of claim 1, wherein the plurality of networked STTs are arranged according to a full-mesh topology.

11. The method of claim 1, wherein the plurality of networked STTs are arranged according to a grid topology.

12. A network control center (NCC) comprising:
   a communication interface;
   a processor;
   data storage containing instructions executable by the processor for causing the NCC to carry out a set of functions, the set of functions comprising:
      generating a simplified link-topology map from a comprehensive link-topology map, wherein the comprehensive link-topology map is representative of node to node links among a plurality of networked satellite-traffic terminals (STTs) including a reference STT, and wherein generating the simplified link-topology map comprises generating the simplified link-topology map with respect to a reference STT, wherein the simplified link-topology map is representative of a simplified set of links that connect the reference STT to each of the other STTs of the plurality, either directly or indirectly through one or more other STTs of the plurality, and wherein the number of links in the simplified set of links is smaller than the number of links in the comprehensive link-topology map;
      generating, based at least in part on the simplified link-topology map, an STT-specific set of link state advertisement (LSA)-transmission instructions for each STT in the plurality, wherein at least one such set of LSA-transmission instructions directs the corresponding STT to transmit LSAs on less than all of the links that extend in the comprehensive link-topology map from the corresponding STT; and
      transmitting the respective sets of LSA-transmission instructions to the respective STTs for which said sets were generated.

13. The NCC of claim 12, wherein transmitting the respective sets of LSA-transmission instructions to the respective STTs for which said sets were generated comprises transmitting the respective sets of LSA-transmission instructions via respective control-channel links with the respective STTs.

14. The NCC of claim 12, wherein the set of functions is carried out in response to detecting a timeout with respect to periodic keep-alive messages from one or more of the STTs in the plurality.

15. The NCC of claim 12, wherein generating the simplified link-topology map with respect to the reference STT comprises conducting a graph search of the comprehensive link-topology map with respect to the reference STT.

16. The NCC of claim 15, wherein the graph search is a breadth-first search.

17. The NCC of claim 12, the set of functions further comprising receiving a user designation of a given STT and responsively designating the given STT as the reference STT.

18. The NCC of claim 12, wherein the generated sets of LSA-transmission instructions collectively route all LSAs towards the reference STT.

19. The NCC of claim 12, wherein the set of functions is carried out in response to detecting a timeout with respect to periodic keep-alive messages from a previous reference STT.

20. The NCC of claim 19, wherein the reference STT is a pre-determined backup with respect to the previous reference STT.

21. The NCC of claim 12, wherein the plurality of networked STTs are arranged according to a full-mesh topology.

22. The NCC of claim 12, wherein the plurality of networked STTs are arranged according to a grid topology.

* * * * *